(12) United States Patent
Lai

(10) Patent No.: US 10,358,073 B2
(45) Date of Patent: Jul. 23, 2019

(54) TRUCK LOADER

(71) Applicant: 1908554 Alberta Ltd., St. Albert (CA)

(72) Inventor: Raymond Lai, St. Albert (CA)

(73) Assignee: 1908554 Alberta Ltd., St. Albert, AB (CA)

( * ) Notice: Subject to any disclaimer, the term of this patent is extended or adjusted under 35 U.S.C. 154(b) by 0 days.

(21) Appl. No.: 15/742,079

(22) PCT Filed: Jul. 8, 2016

(86) PCT No.: PCT/CA2016/050805
§ 371 (c)(1),
(2) Date: Jan. 5, 2018

(87) PCT Pub. No.: WO2017/004724
PCT Pub. Date: Jan. 12, 2017

(65) Prior Publication Data
US 2018/0208096 A1    Jul. 26, 2018

Related U.S. Application Data

(60) Provisional application No. 62/321,554, filed on Apr. 12, 2016, provisional application No. 62/190,101, filed on Jul. 8, 2015.

(51) Int. Cl.
*B60P 1/44* (2006.01)
*B60P 1/64* (2006.01)
(Continued)

(52) U.S. Cl.
CPC .............. *B60P 1/4407* (2013.01); *B60P 1/003* (2013.01); *B60P 1/64* (2013.01); *B60P 1/6445* (2013.01);
(Continued)

(58) Field of Classification Search
CPC ......... B60P 1/4407; B60P 1/64; B60P 1/4442; B60P 1/28; B60P 1/32; B60P 3/1058; B60P 3/1033; B60R 9/06
See application file for complete search history.

(56) References Cited

U.S. PATENT DOCUMENTS 3,915,496 A * 10/1975 Mabry, Jr. ............... B60P 1/32
                                                     298/1 A
5,213,458 A    5/1993 Preller et al.
(Continued)

FOREIGN PATENT DOCUMENTS

CA           2756208 A1    4/2013
CN          101209689 A    7/2008

OTHER PUBLICATIONS

International Search Report Corresponding to PCT/CA2016/050805 dated Aug. 25, 2016.
(Continued)

*Primary Examiner* — Kaitlin S Joerger
(74) *Attorney, Agent, or Firm* — Davis & Bujold PLLC; Michael J. Bujold

(57) ABSTRACT

A truck loader is provided which includes a base placeable within a truck bed; a first end of a platform is pivotably connectable to the base proximate to a first end of the base; a support is pivotably secured to the platform and pivotably secured to the base proximate to a second end of the base. The support is moveable from a first position, where a second end of the platform is positioned proximate to the base, to a second position, where the second end of the platform is elevated relative to the base.

12 Claims, 25 Drawing Sheets

(51) Int. Cl.
  *B60P 1/00* (2006.01)
  *B60R 9/06* (2006.01)
  *B60R 9/10* (2006.01)
  *B60R 9/12* (2006.01)

(52) U.S. Cl.
  CPC .................. *B60R 9/06* (2013.01); *B60R 9/10* (2013.01); *B60R 9/12* (2013.01)

(56) References Cited

U.S. PATENT DOCUMENTS

| | | | |
|---|---|---|---|
| 5,328,320 A | 7/1994 | Farrow et al. | |
| 5,836,657 A | 11/1998 | Tilley et al. | |
| 5,934,863 A * | 8/1999 | Beck | B60P 1/433 |
| | | | 144/344 |
| 6,099,232 A * | 8/2000 | Dixon | B60P 1/14 |
| | | | 224/310 |
| 6,176,672 B1 * | 1/2001 | Egan | B60P 3/122 |
| | | | 414/462 |
| 6,413,033 B1 * | 7/2002 | Monroig, Jr. | B60P 3/122 |
| | | | 414/462 |
| 6,981,835 B1 | 1/2006 | Groth | |
| 7,114,784 B1 | 10/2006 | Blumenstein et al. | |
| 7,125,082 B2 * | 10/2006 | Copus | B60P 1/24 |
| | | | 298/1 A |
| 7,997,850 B2 * | 8/2011 | Hutchison | B60P 3/122 |
| | | | 414/478 |
| 8,215,893 B2 * | 7/2012 | Simpson | B60P 3/122 |
| | | | 414/462 |
| 10,017,096 B1 * | 7/2018 | Helmick | B60P 3/1066 |
| 2004/0062629 A1 * | 4/2004 | Kelly | B60P 1/43 |
| | | | 414/462 |
| 2009/0081015 A1 | 3/2009 | Hutchison | |
| 2011/0202199 A1 * | 8/2011 | Crane | B60P 3/122 |
| | | | 701/2 |

OTHER PUBLICATIONS

Written Opinion Corresponding to PCT/CA2016/050805 dated Aug. 25, 2016.

* cited by examiner

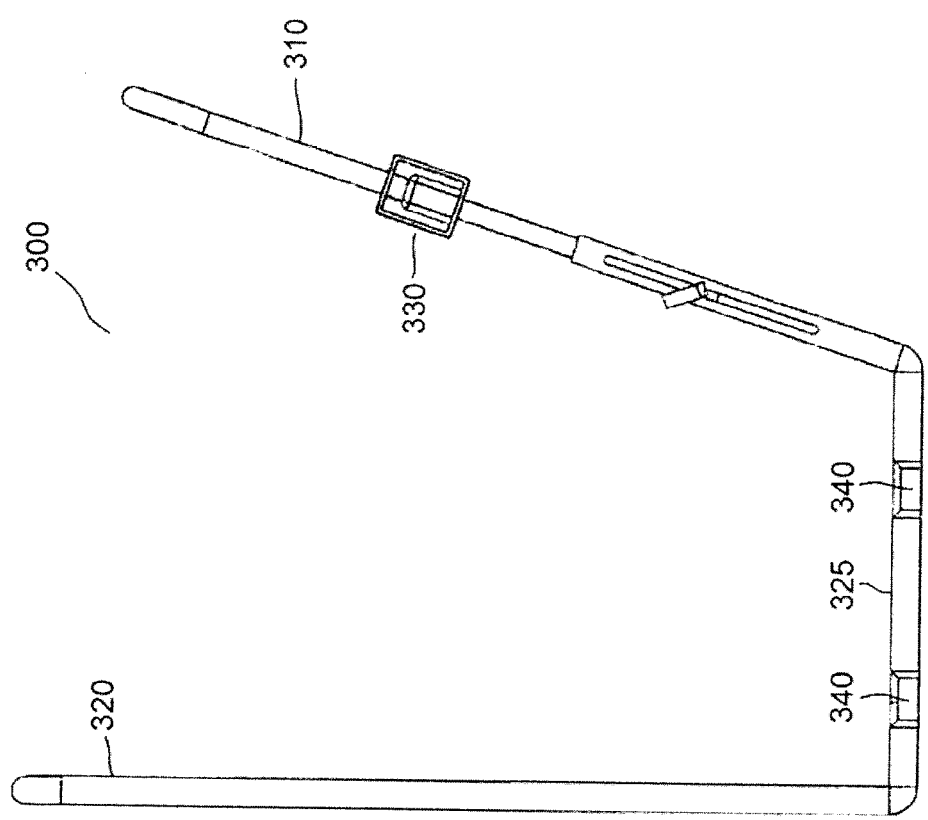

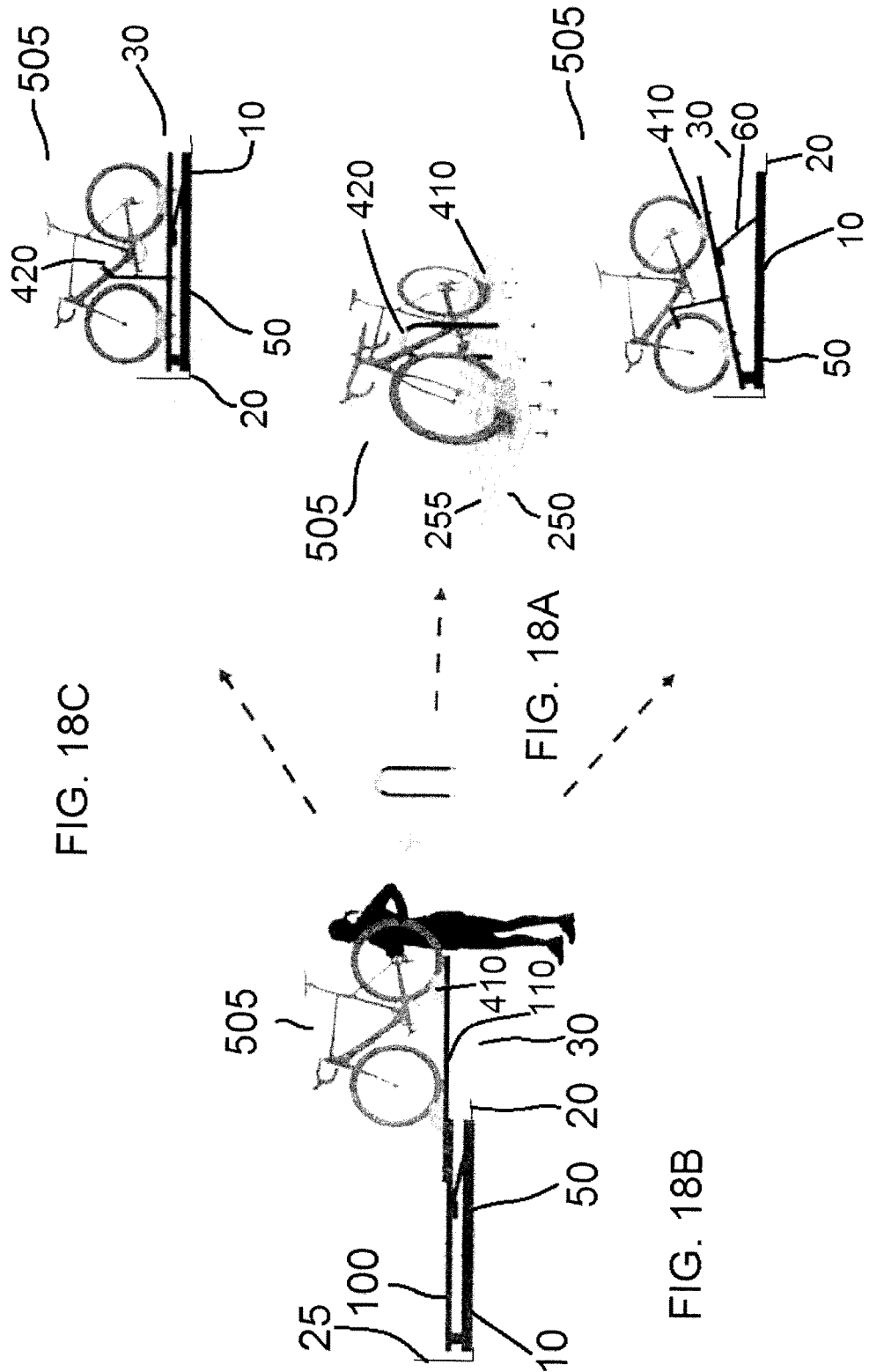

＃ TRUCK LOADER

RELATED APPLICATIONS

This application claims the benefit of U.S. Provisional Patent Application No. 62/190,101 filed Jul. 8, 2015, and U.S. Provisional Patent Application No. 62/321,554 filed on Apr. 12, 2016, both of which are hereby incorporated by reference in their entirety.

FIELD OF THE INVENTION

The invention relates to devices for use in truck beds, and more particularly to devices used to store items in truck beds.

BACKGROUND

Truck beds in pickup trucks are frequently used for hauling various loads. A challenge faced by moving such loads in a truck bed is that the loads tend to move or shift around, possibly becoming damaged while in the truck bed. Furthermore, long cargos present difficulties, for example it is difficult to store long cargos that extend beyond the tailgate of the truck in a safe and secure manner. Existing truck racks available have a number of deficiencies. For example, they can be expensive, often preclude the use of truck bed covers, are bulky (often making it difficult to enter a garage), and heavy, making them difficult to install or remove. It may also be difficult to place loads on existing truck racks.

SUMMARY

A truck loader is provided. The truck loader is a versatile truck cargo management system that is compatible with most existing truck beds covers and racks, including some 5-wheel hitches. The truck loader can be folded down or removed easily, and does not change the appearance of the truck, and can be partially rolled out of the truck bed for ease of loading. The truck loader also can be used as an anchor on which various accessories (such as truck racks, bicycle racks, kayak racks and cargo boxes) can be easily installed and removed.

A truck loader is provided including: a base placeable within a truck bed; a platform, the first end of the platform pivotably connectable to the base proximate to a first end of the base; a support pivotably secured to the platform and pivotably secured to the base proximate to a second end of the base, and wherein the support is moveable from a first position wherein a second end of the platform is positioned proximate to the base to a second position wherein the second end of the platform is elevated relative to the base.

The truck loader may include a platform extension configured to retractably extend from the second end of the platform and may include a plurality of loops configured to secure the base to the truck bed. The platform and platform extension may include a plurality of perforations. The platform may include arms forming a C channel for supporting the platform extension.

A first end of the support may be slidable along the base. A jack may be used to move the support from the first position to the second position. The support may be fixed in position using pins passing through the sides of the base.

The truck loader may include a plate securable to the platform or the platform extension, the plate including a plurality of apertures, at least a portion of the apertures usable for securing the plate to the platform or the platform extension. The truck loader may further include a cargo container securable to the plate.

BRIEF DESCRIPTION OF THE DRAWINGS

FIG. 17 is a side view thereof.
FIG. 18A is a perspective view of a plate, showing a bicycle secure in position.
FIG. 18B is a side view of an embodiment of the invention, showing a bicycle being loaded.
FIG. 18C is a side view thereof, showing the bicycle in position on a lowered truck loader.
FIG. 18D is a side view thereof, showing the bicycle in position on a truck holder in a raised position.

DETAILED DESCRIPTION

Figure 1:
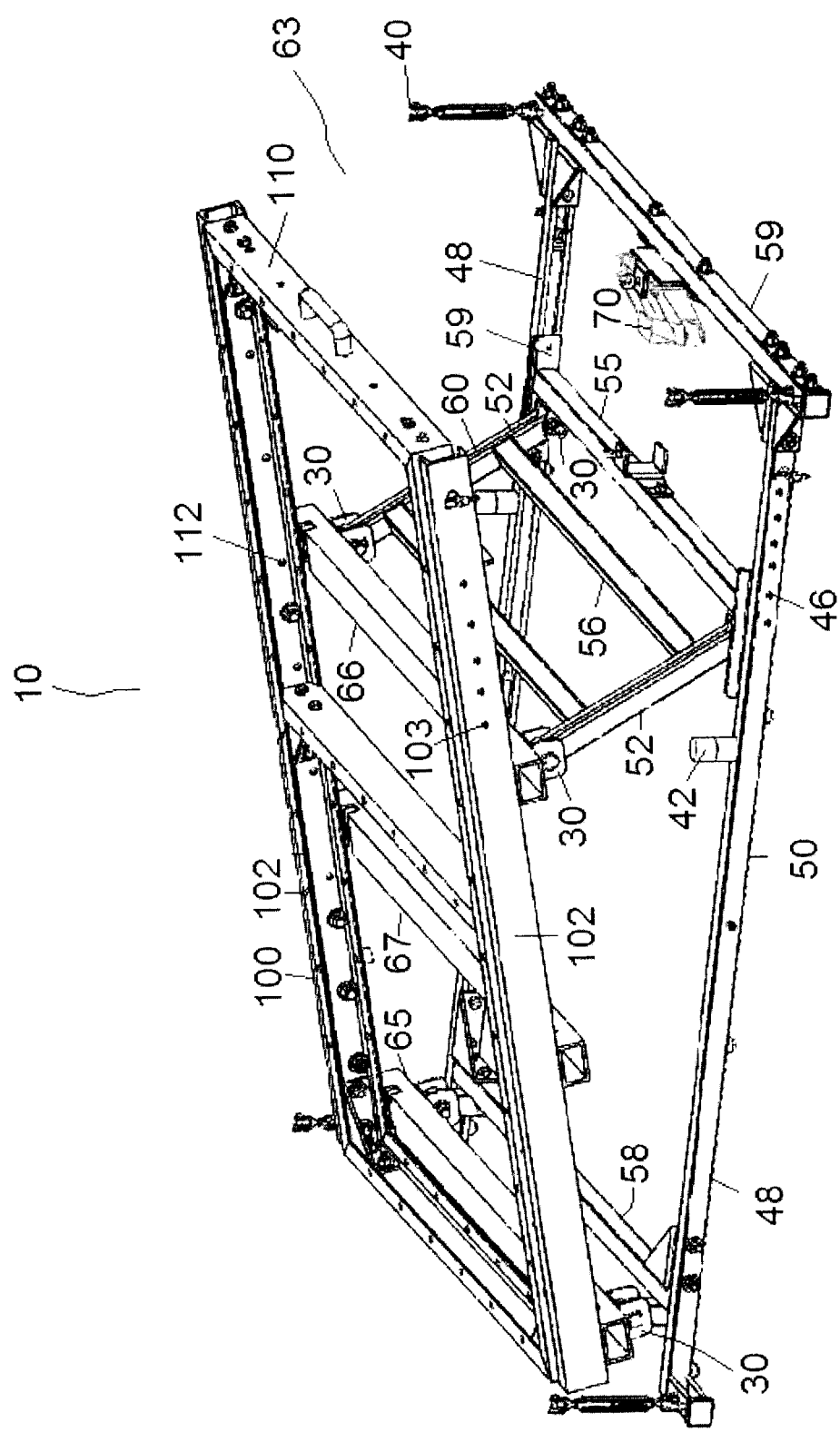
FIG. 1 is a perspective view of an embodiment of a truck loader according to the invention in a raised and closed position.
Figure 2:
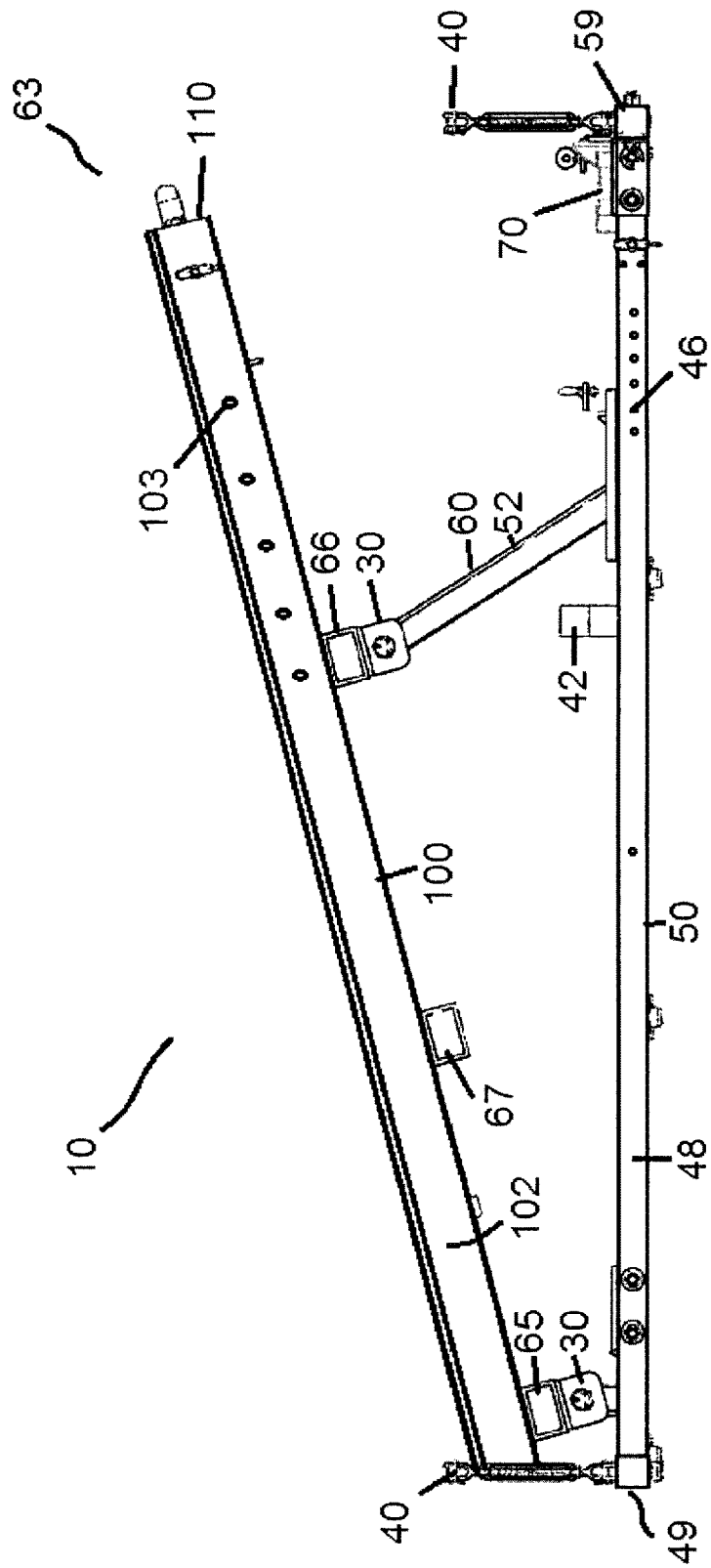
FIG. 2 is a side perspective view thereof.
Figure 3:
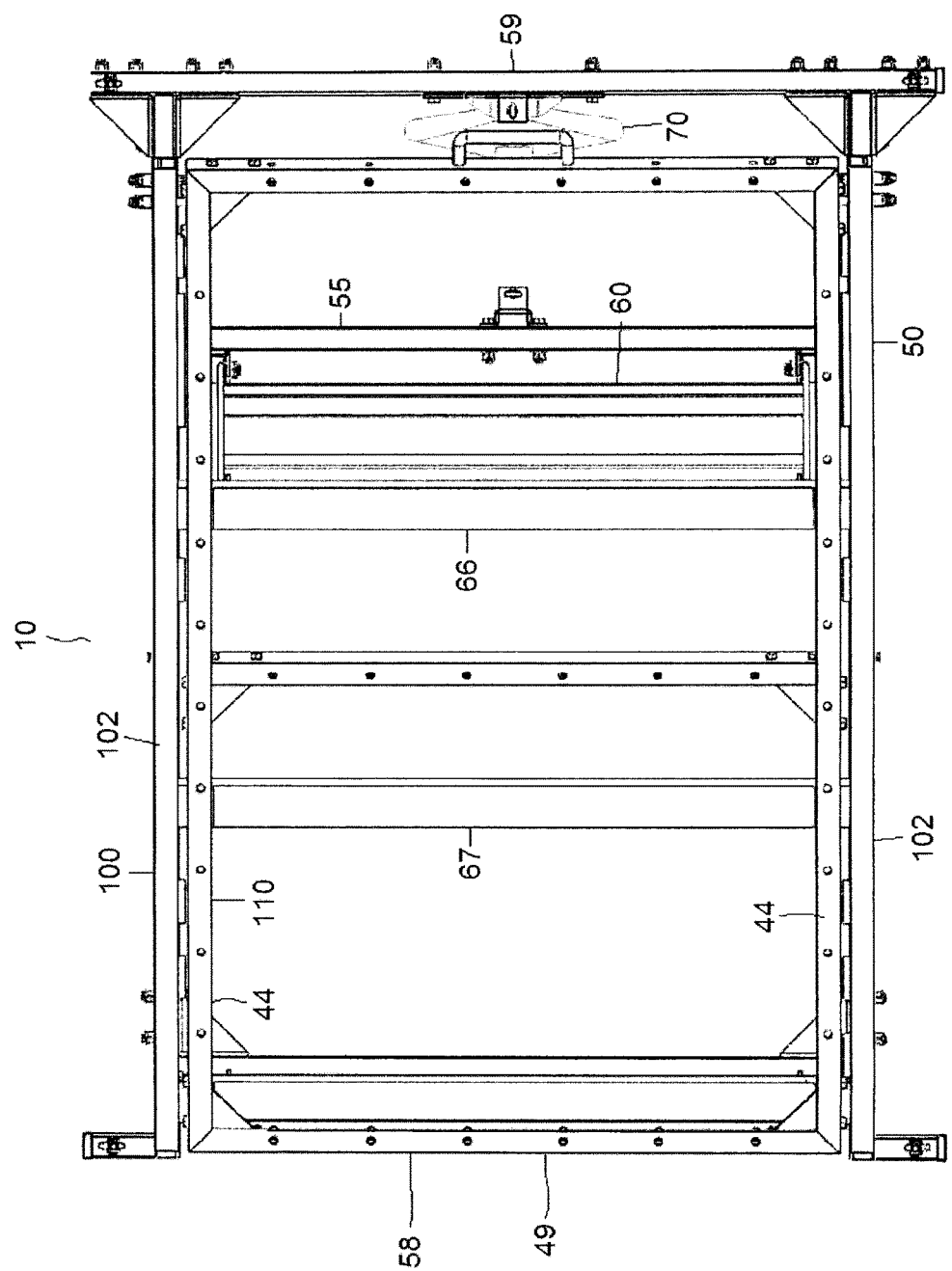
FIG. 3 is top view thereof.
Figure 4:
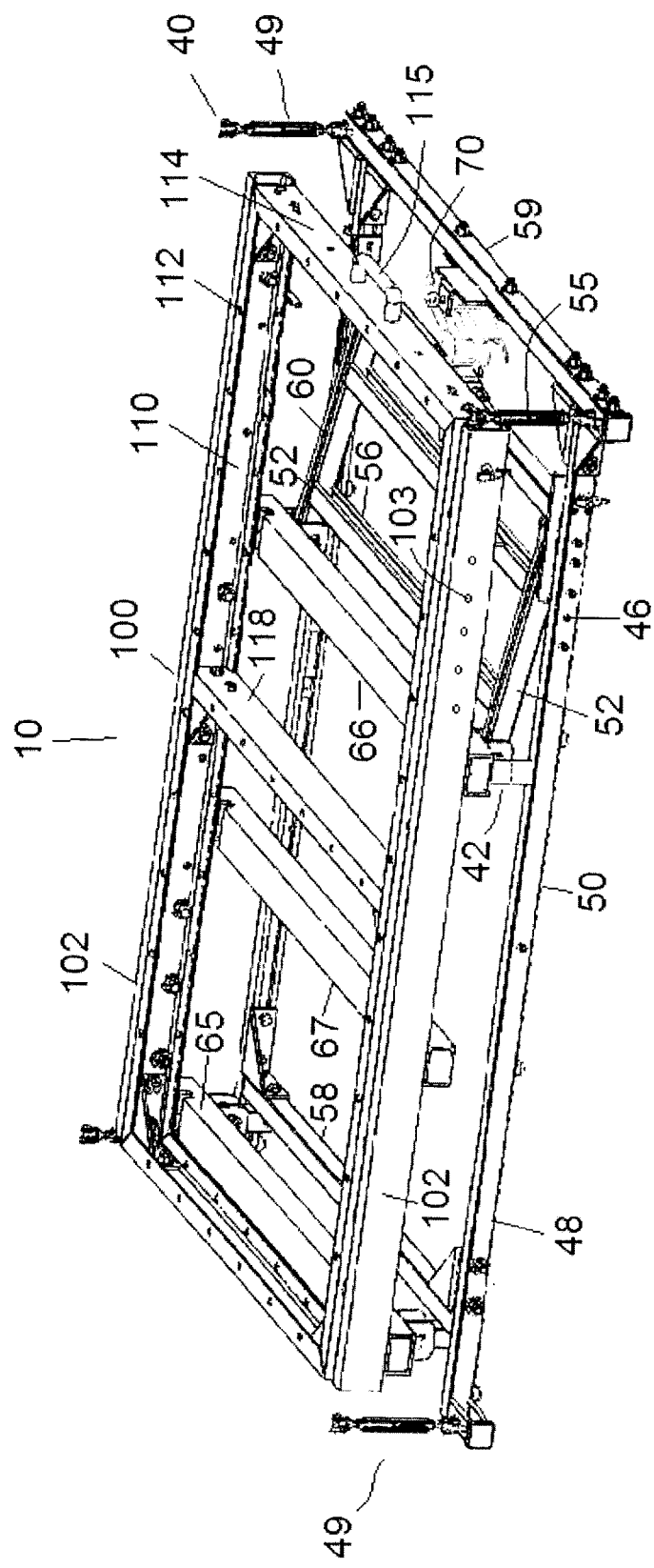
FIG. 4 is a perspective view thereof, showing the truck loader in a lowered and closed position.
Figure 5:
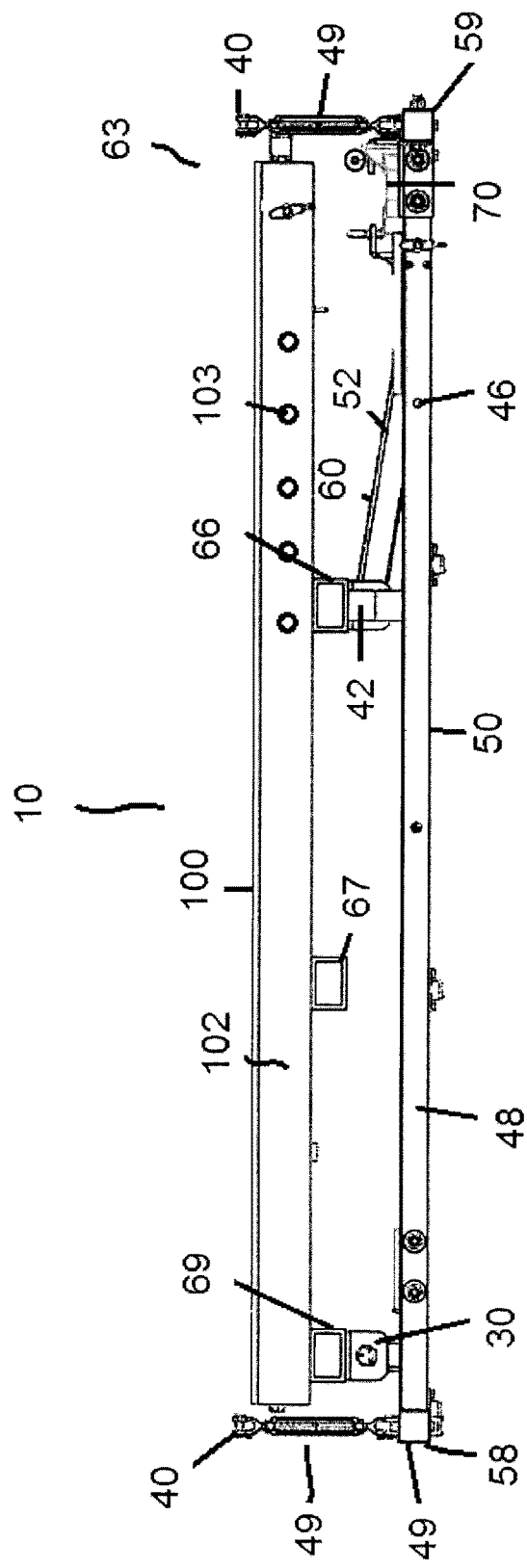
FIG. 5 is a side view thereof.
Figure 6:
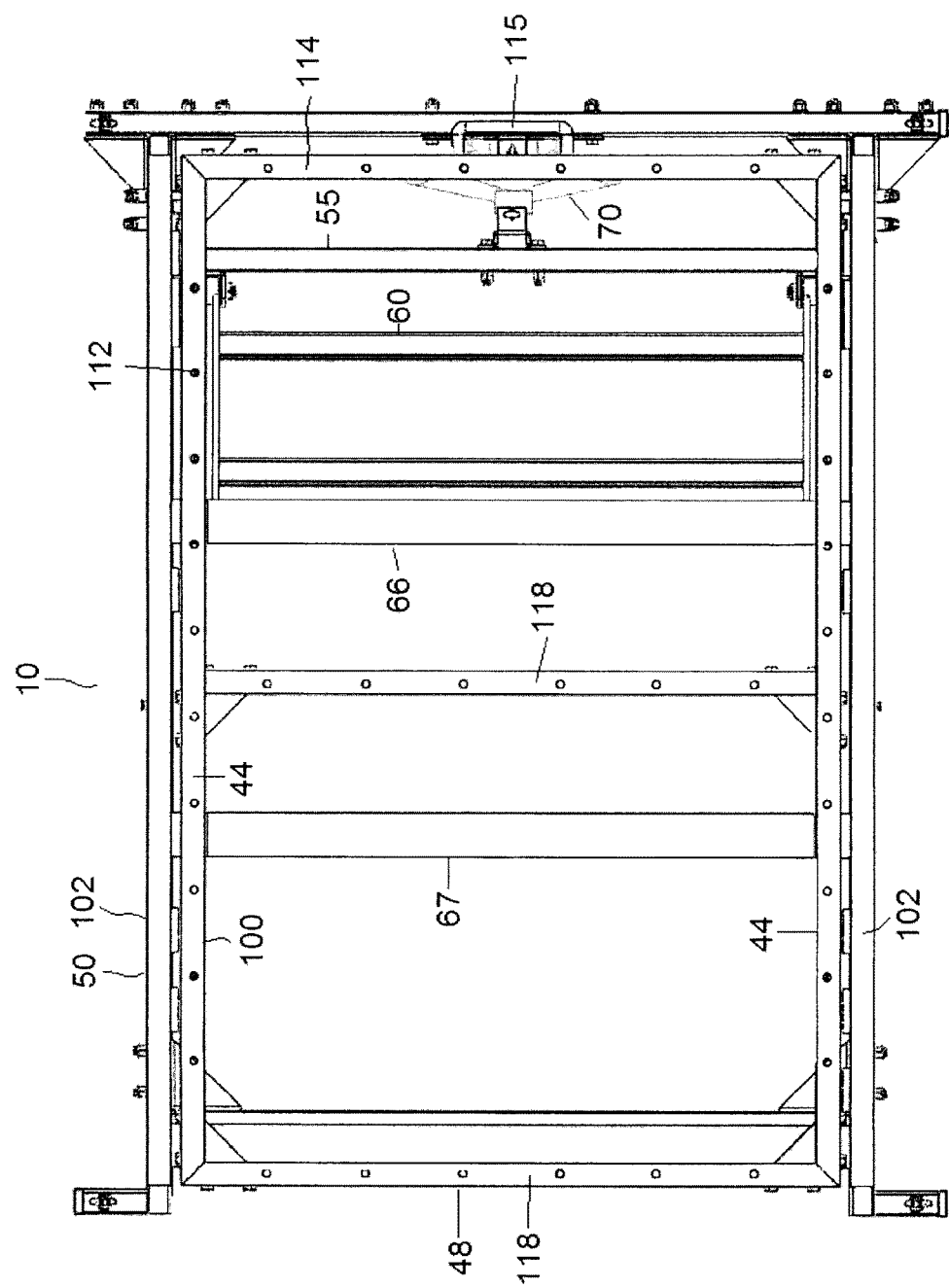
FIG. 6 is a top view thereof
Figure 7:
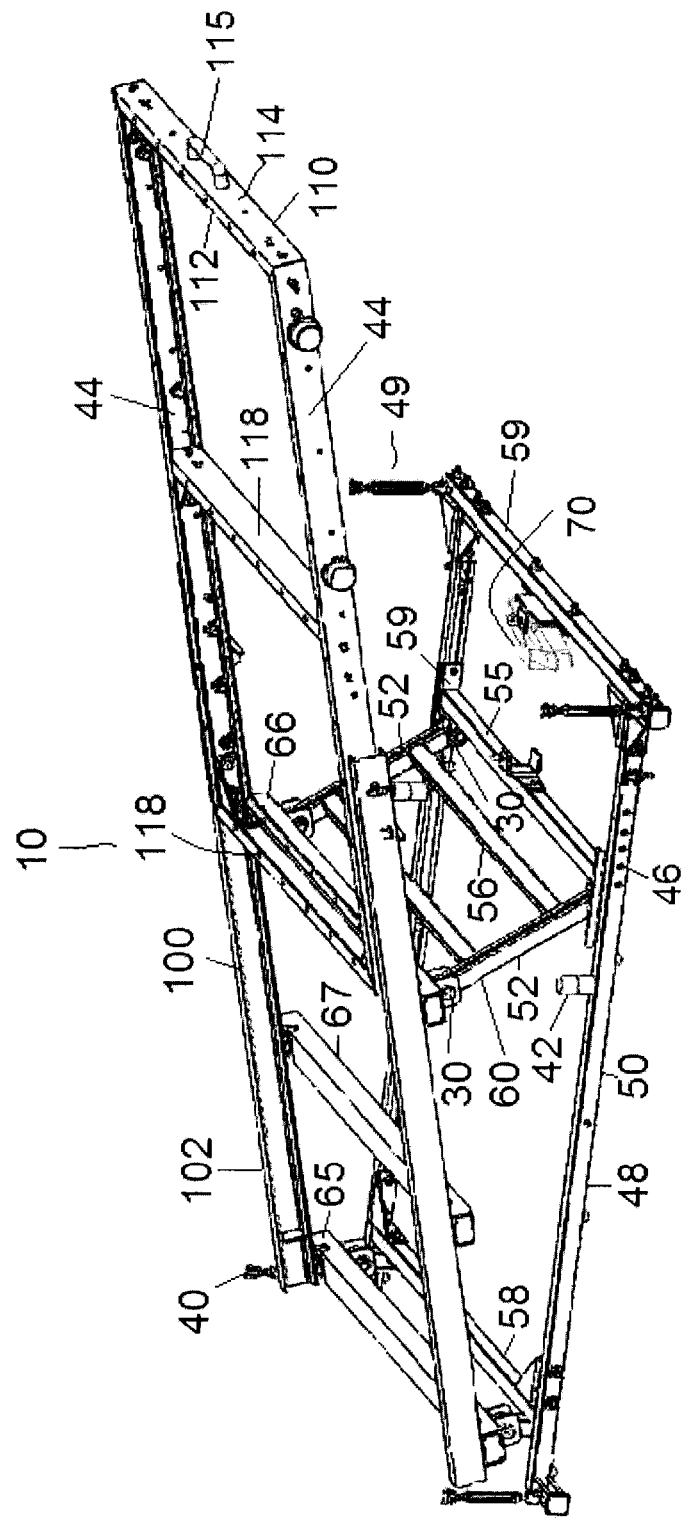
FIG. 7 is a perspective view thereof, showing the truck loader in a raised and extended position.
Figure 8:
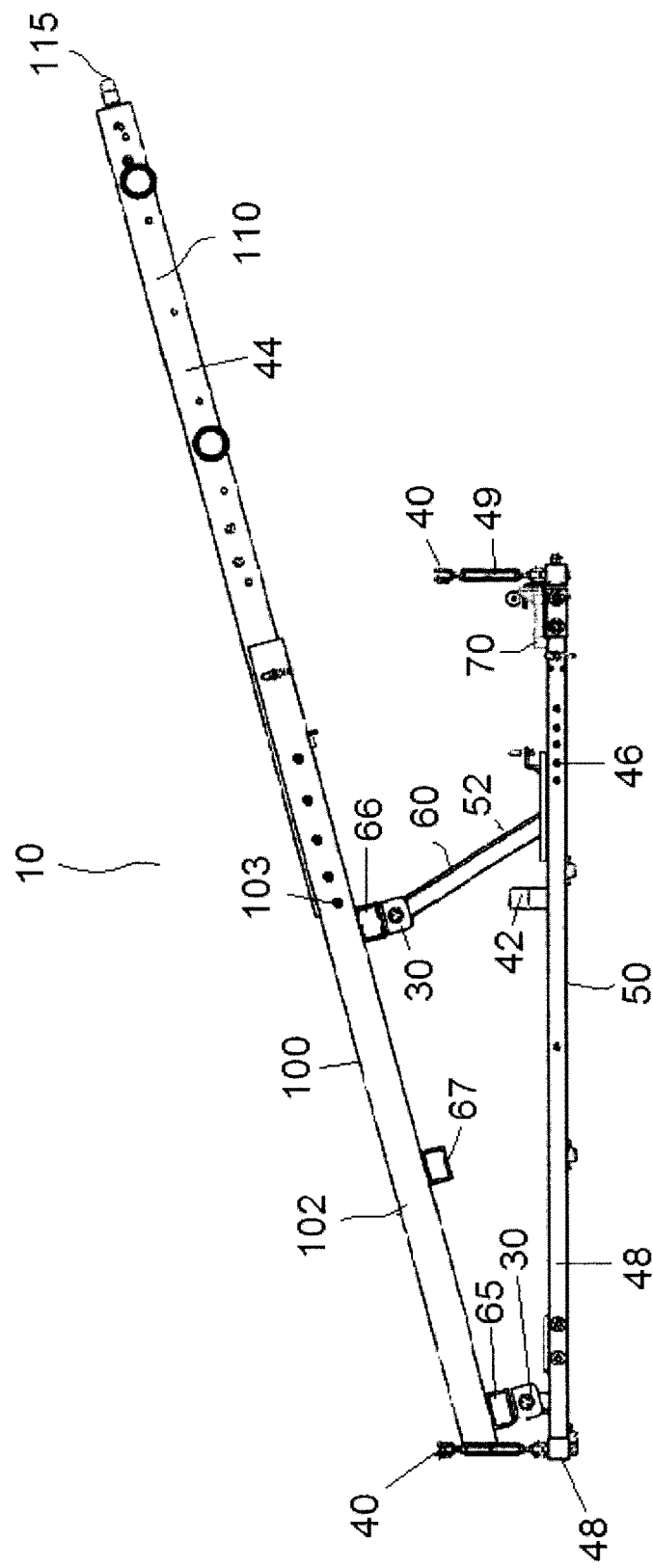
FIG. 8 is a side view thereof.
Figure 9:
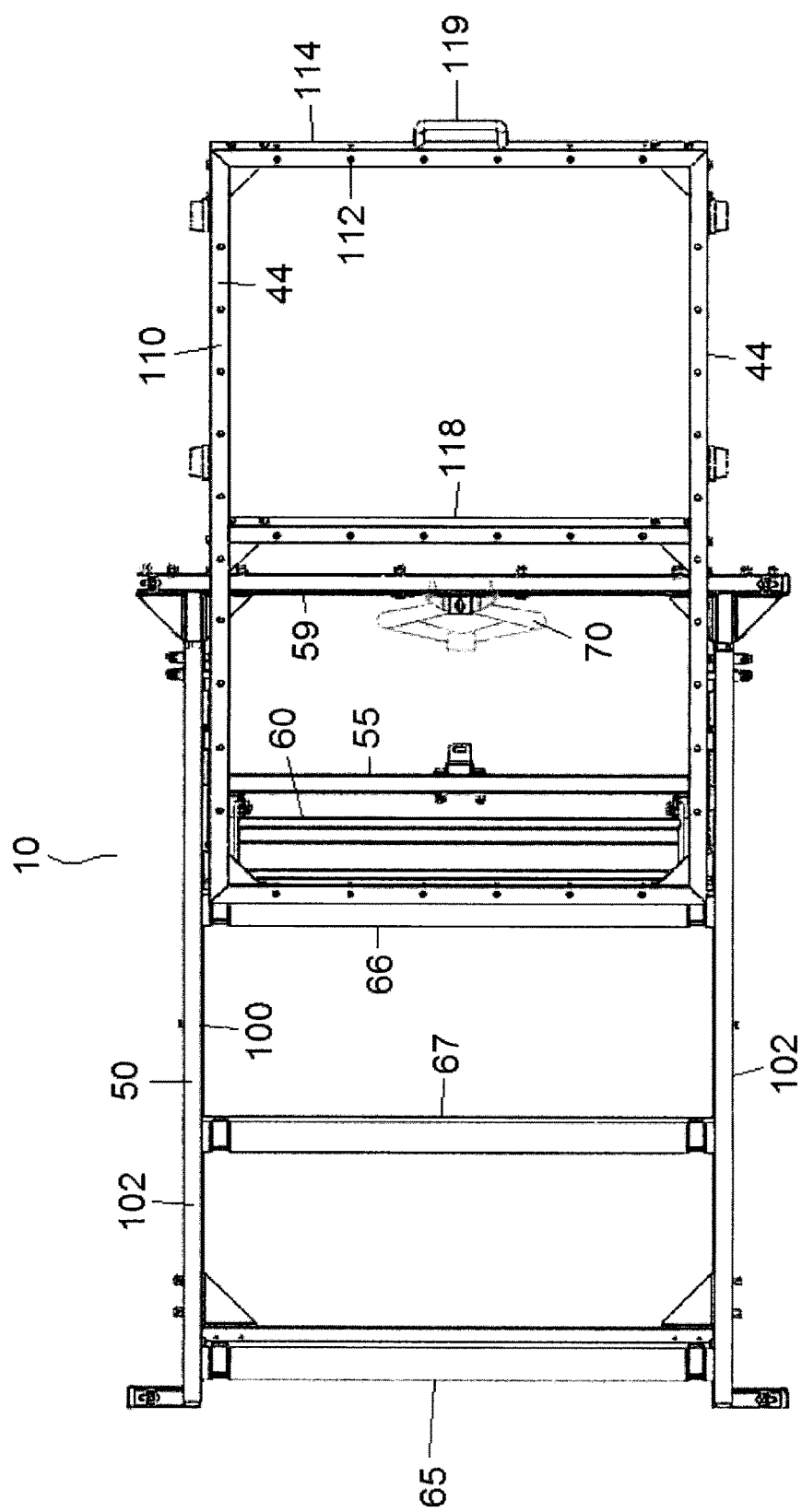
FIG. 9 is a top view thereof.
Figure 10:
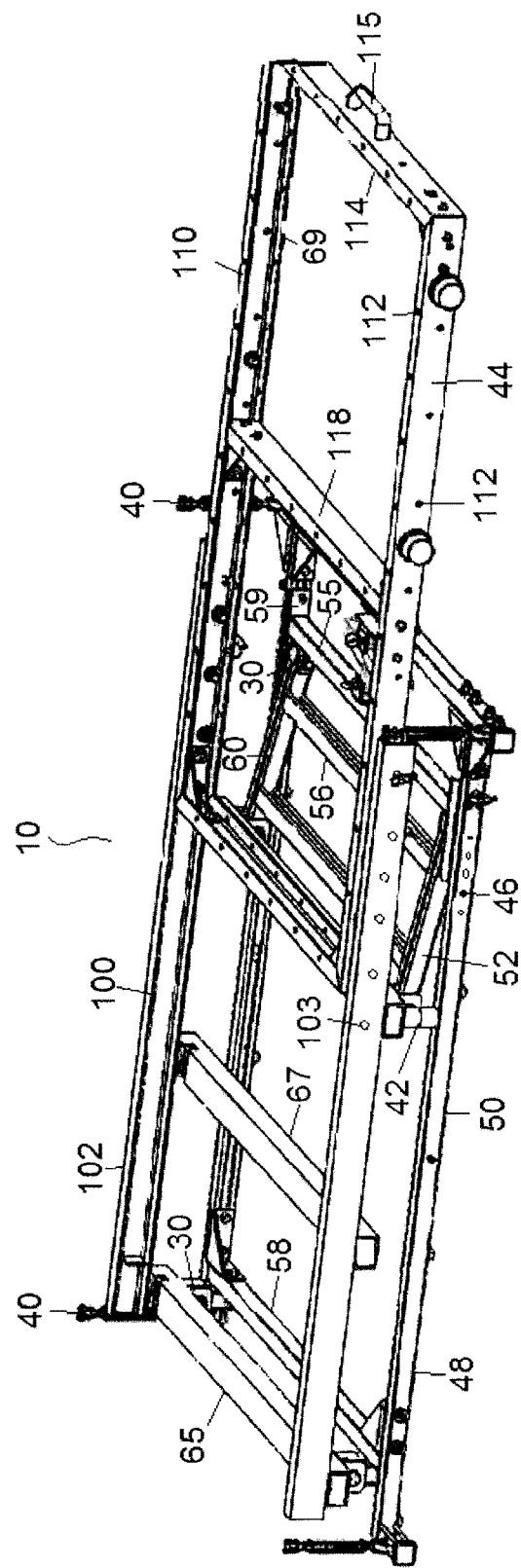
FIG. 10 is a top perspective view thereof, showing the truck loader in a lowered and extended position.
Figure 11:
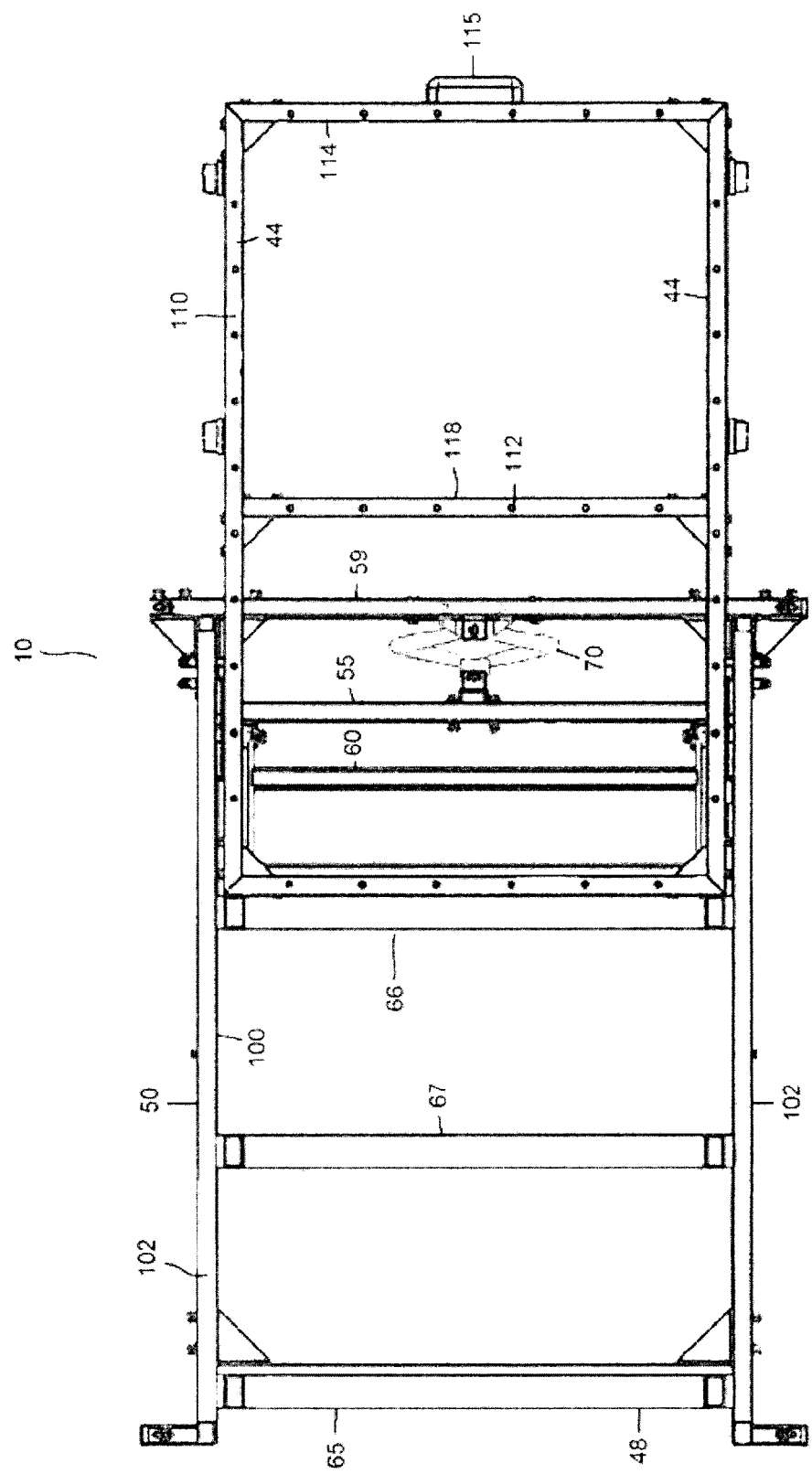
FIG. 11 is a top view thereof.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "cargo" and "load" are used synonymously and refer to items intended for storage in or on a truck.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

With reference to FIGS. 1 through 25, truck loader 10 is designed to allow truck owners to quickly and safely secure various types of sport equipment and long cargo loaded on truck bed 20. Loader 10 is particularly useful for cargo that is longer than the length of truck bed 20 (which is typically 5.5 or 6.5 feet in most trucks sold in North America). Examples of such cargo include long lumber, ladders, kayaks, ladders, ski equipment and canoes. Depending on the accessories installed, loader 10 also can be used as a cargo organizer and cargo loader. Loader 10 is easy to use and it takes up minimal space in truck bed 20. Since the cargo rests on loader 10, tailgates 30 can be opened and closed without interference, and a user can access the unused space in the bed 20.

Loader 10, as shown in FIGS. 1 through 11, includes base 50, platform 100 and support 60. Base 50 may be a rectangular structure for placement on truck bed 20, and may be solid or a frame structure with a sliding crossbar 55. For stabilization, sides 48 of base 50 may be adjacent to (and thus, immobilized by) tire rims 46 on respective sides, and the front 49 of base 50 extends towards the front 25 of truck bed 20. To accommodate different lengths of truck bed 20, base 50 may be made of hollow alloys or steel, and may allow 'telescoping' or C channels, for length adjustment. Depending on the model of the truck, the base 50 may be further immobilized by using the preexisting structures in the trucks. For example in the F150 (2011 model), two pairs of anchors are present on the side wall of bed 20, one pair front near the cab, the other on opposite sides of the bed 20 near tailgate 30 which can be used to secure base 50 using loops connected to base 50. One possible mechanism to connect truck anchors to loader 10 is to use turn buckles that can pass through loop 40 and the truck anchors. Loop extender 49 is positioned so to fall outside of platform 100 when platform 100 is in a closed or open position. Depending on the application, there is space between platform 100 and the base 50 for the installation of electrically or manually powered hydraulic or other mechanic device to lift platform 100, such as jack 70.

Sides 48 of base 50 include perforations 46 sized to receive a pin to hold sliding crossbar 55. Sliding crossbar 55 is pivotably connected to support 60 and pins passing through perforations 46 prevent sliding crossbar 55 and support 60 from moving when loader 10 is in use. Base 50 also includes front crossbar 58 and back crossbar 59 connecting sides 48, although more or less crossbars may be used. Sliding crossbar 55 is supported by sliding members 59 which are slidable along, and supported by the inside of sides 48 which may, for example form a C channel for receiving the sliding element.

Base 50 may include supports 42, sized and positioned to support platform 100, when platform 100 is in a closed position.

Platform 100 includes first and second cross arms 65, 66, although more or less cross arms may be present. Additional cross arms, such as cross arm 67 may be present for additional support, and cross arms 65, 66, 67, are generally positioned below platform 100 and are supported by sides 102 of platform 100. The top of sides 102 may include a plurality of perforations (not shown) for receiving pins, bolts, or the like to secure accessories to platform 100. Cross arm 65 is pivotably connected to base 50 by hinges 30. Cross arm 66 is pivotably connected to support 60 by hinges 30. An open area may be provided by the positioning of crossbars 65, 66 and 67 to make loader 10 compatible with trucks that have a fifth-wheel hitch installed.

Support 60 includes two arms 52 pivotably anchored to base 50 via hinges 30 and to cross arm 66 of platform 100. Cross bars 56 (which may be made of metal) connects arms 52 of support 60. In an alternative embodiment of the invention, support 60 may be a single piece of metal or the like.

In an embodiment of the invention (not shown) support 60 may not be fixed to platform 100 and the top of support 60 may be sized and shaped to fit into one of a plurality of aligned notches located on the bottom of sides 102. By doing so, a user can provide different angles for the platform.

Platform 100 may include platform extension 110. Platform extension may be slidable from platform 100, for example by having arms 44 of platform extension 110 slidably fit within the inner sides 102 of platform 100, for example within C channels, as shown in the FIG. 1 to 11, rollers, or telescoping. Platform extension 110 is parallel to and can be moved axially from platform 100 to extend the length of platform 100. Platform extension 110 may include a crossbar 118 and end bar 114, which may include handle 115, to allow a user to pull platform extension 110 into place. Platform extension may be kept in position using pins to pass through perforations 112 on platform extension 110 and perforations 103 on platform 100, or alternatively, or in combination, perforations on an accessory, as described below.

An end 63 of platform 100 may be elevated manually from a first position wherein platform 100 is positioned proximate to base 50 to a second position wherein end 63 of platform 100 is elevated relative to base 50, for example using handle 115. Alternatively, jack 70, which may be manual or powered, may be used to raise platform 100 by pushing the lower end of support 60.

Loader 10 may be made of different materials to accommodate both light loads (300-500 lbs.) and heavy loads (>1000 lbs.). A light load model may be light weight and easy to install and detach from the truck. A manually driven jack 70 can facilitate the lifting of the platform 100. Loader 10 is versatile and can be installed in trucks of different models and different bed lengths, and is compatible with most types of bedcovers, canopies and even some models of fifth-wheel hitches. Loader 10 is also relatively inexpensive to produce and may be sold disassembled in kits for assembly by a user.

Additional modifications may be made to loader 10, and depending on the shapes of the specific types of cargo, various accessories may be provided. These accessories may be held in place to platform 100 and platform extension 110 using perforations 103 and 112 which may be on both the sides and top of platform 100 and platform extension 110. Examples of embodiments of accessories are shown in FIGS. 12 through 19 and 21 to 25.

Figure 12:
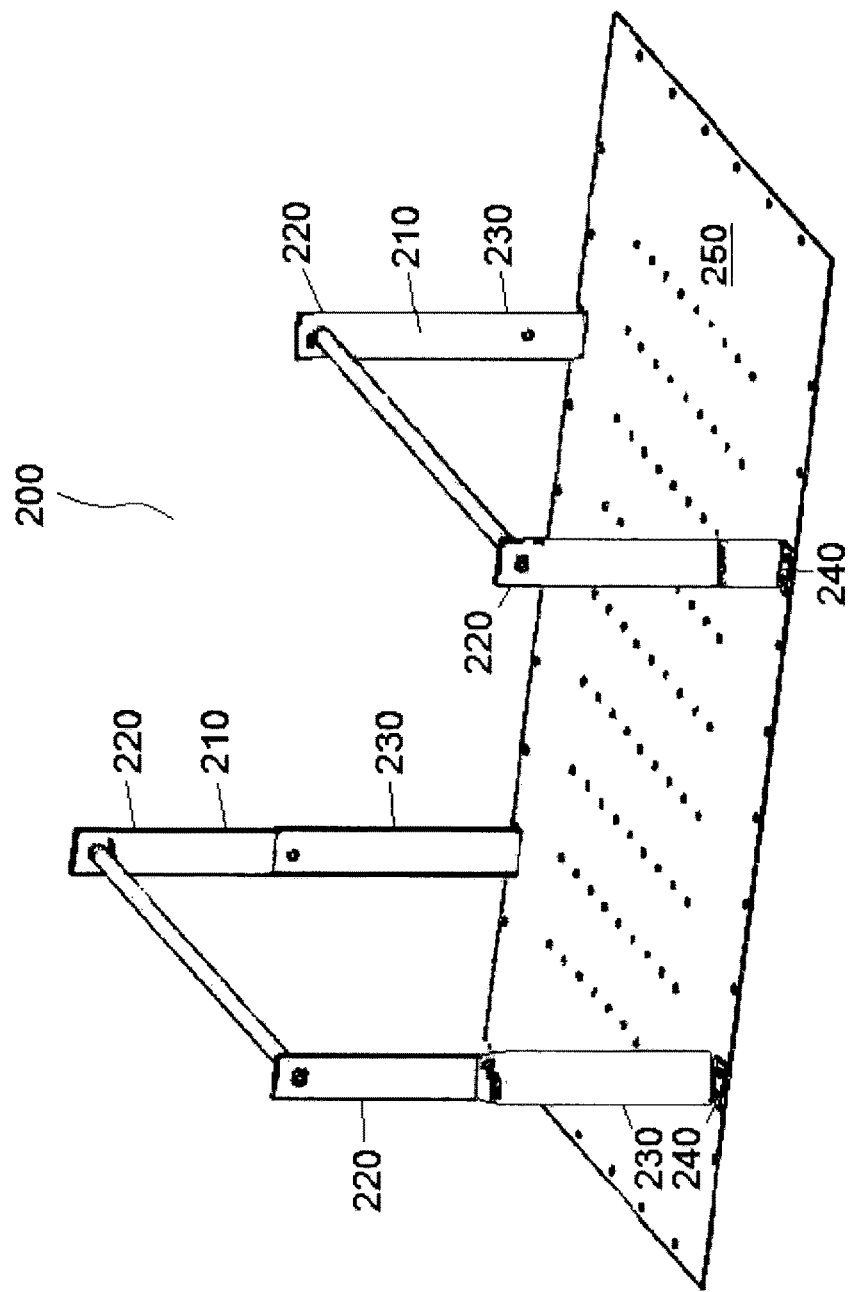
FIG. 12 is a perspective view of a truck rack for use with the truck loader.
Figure 13:
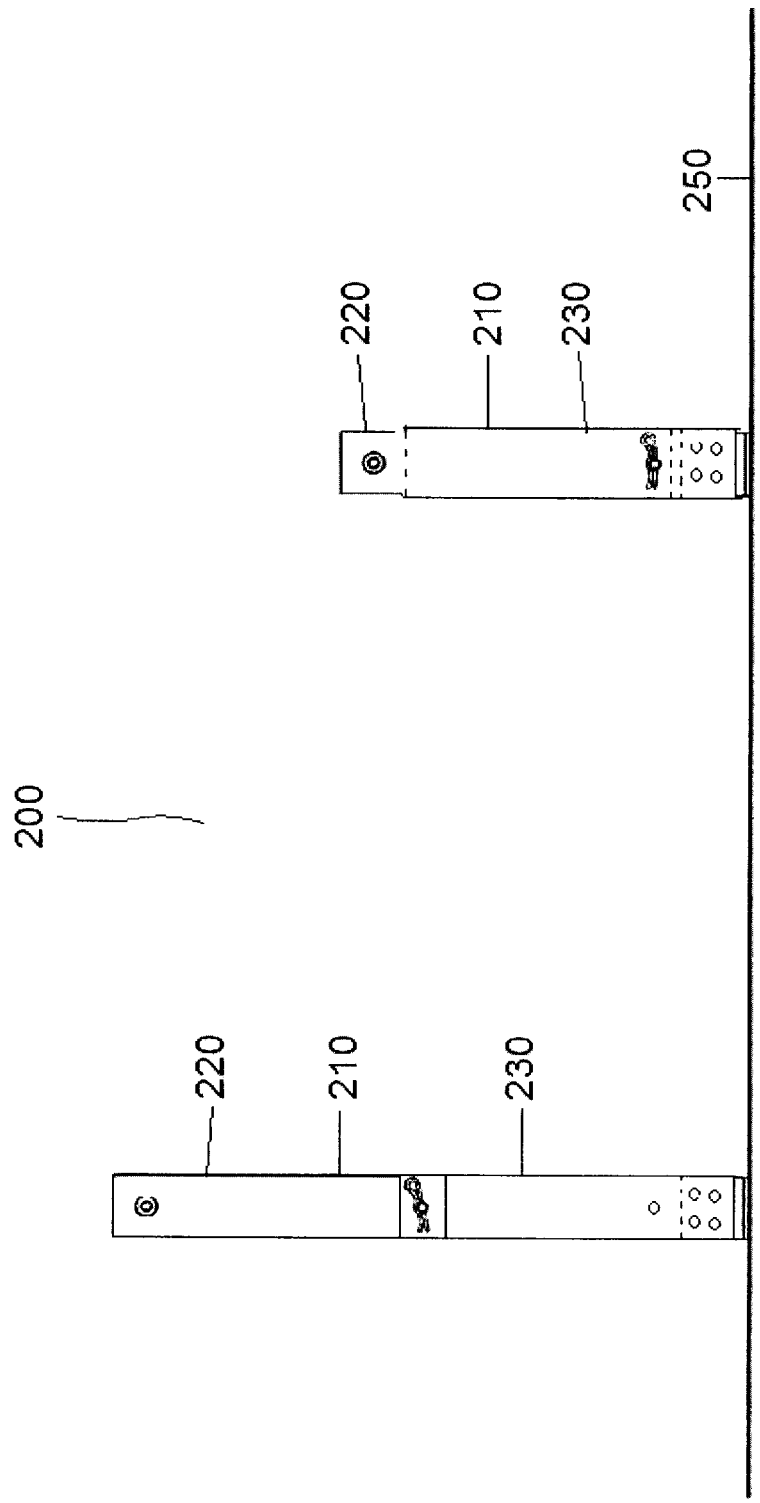
FIG. 13 is a side view thereof.
Figure 14:
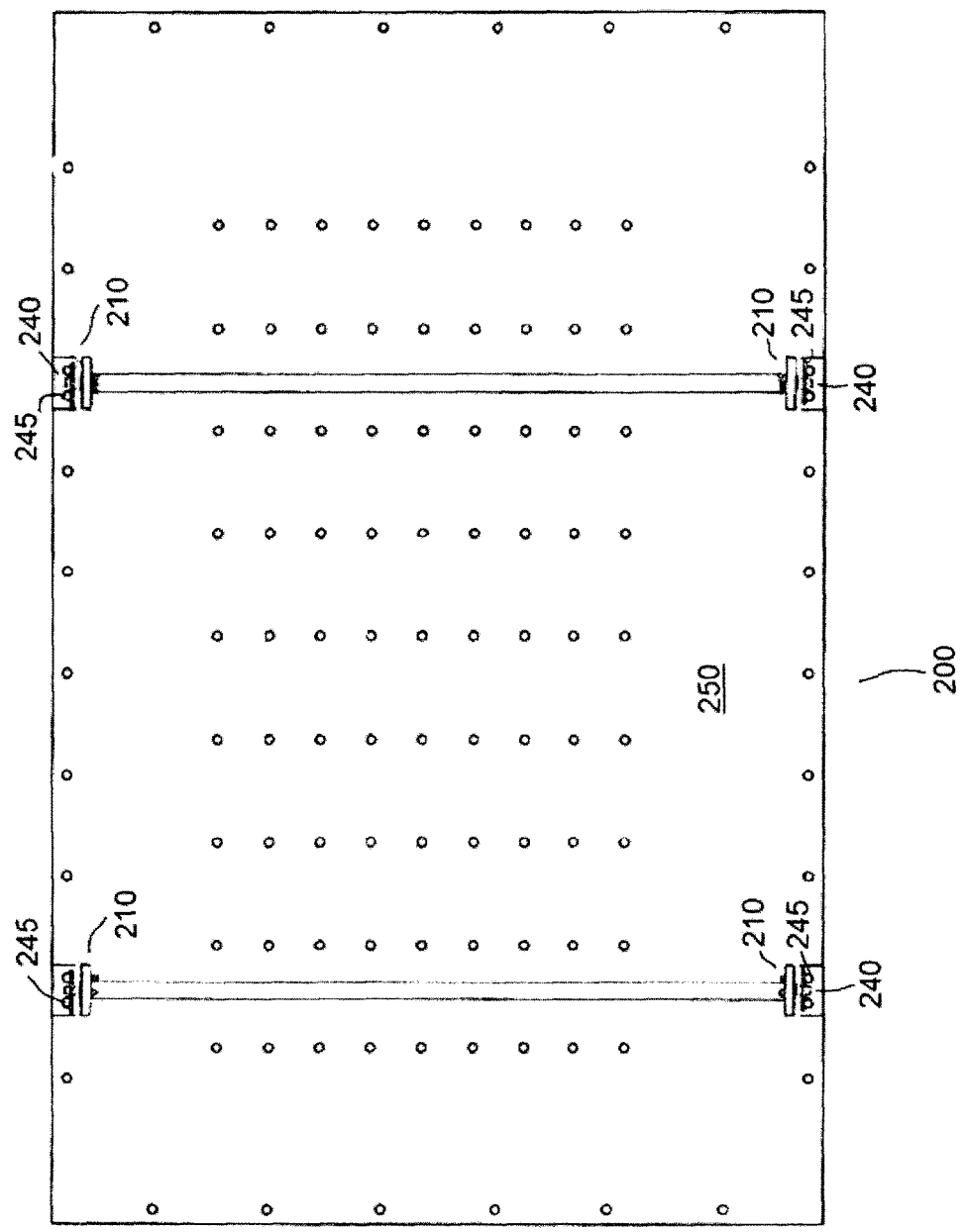
FIG. 14 is a top view thereof.

FIGS. 12 through 14 display an embodiment of a truck rack 200 for use with loader 10. Rack 200 includes one or more height adjustable bars 210. Bars 210 are fixed at each end to first leg 220, which is height adjustable by sliding first leg 210 within second leg 230. Second leg 230 includes horizontal extension 240 having perforations 245 for attachment to plate 250 or directly to the platform 100 or platform extension 110. Plate 250 and horizontal extension 240 may be fixed to platform 100 and/or platform extension 110 via pins, bolts or the like.

Rack 200 can be used for a variety of purposes to hold loads in place by securing the loads to bar 210 or legs 220, 230. Plate 250, which includes a plurality of perforations 255, can be used with a wide variety of accessories as described below.

Figure 16:
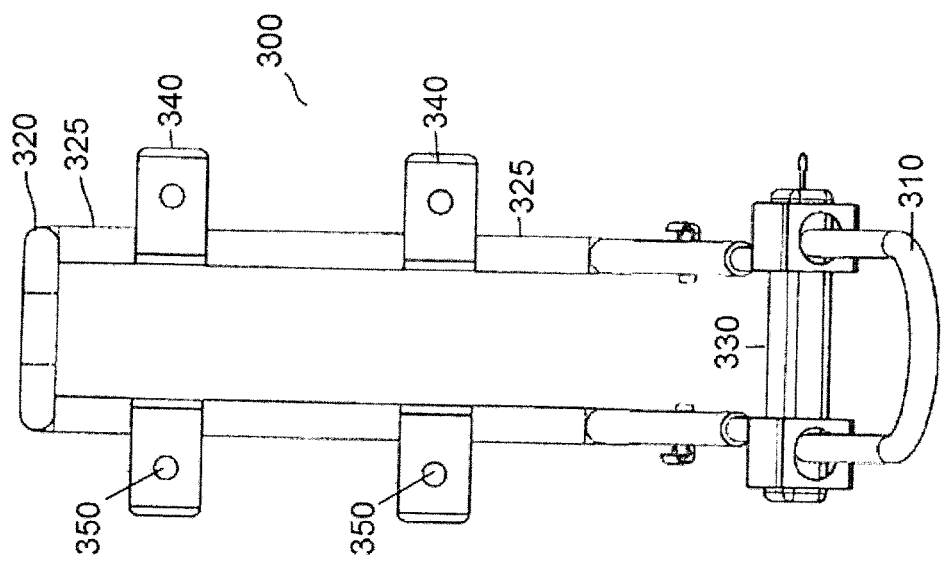
FIG. 16 is a top view thereof.
Figure 15:
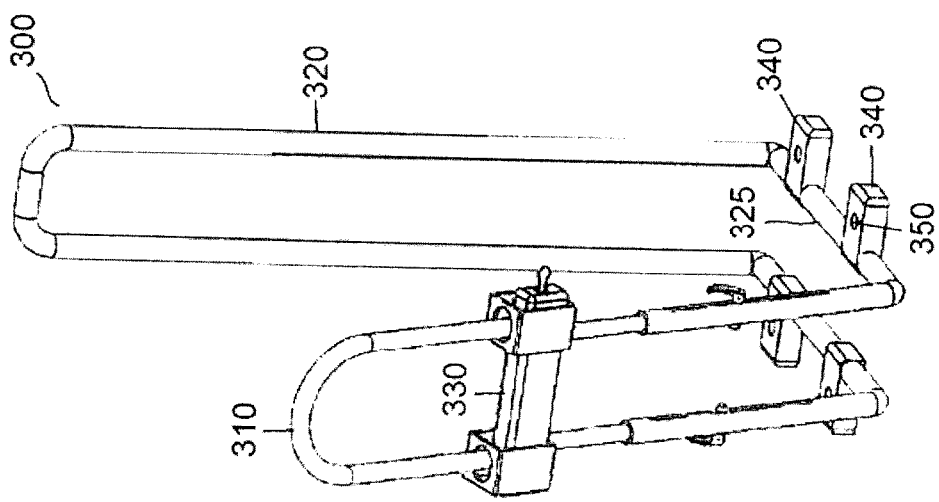
FIG. 15 is a perspective view of a bicycle rack for use with the truck loader.
Figure 18E:
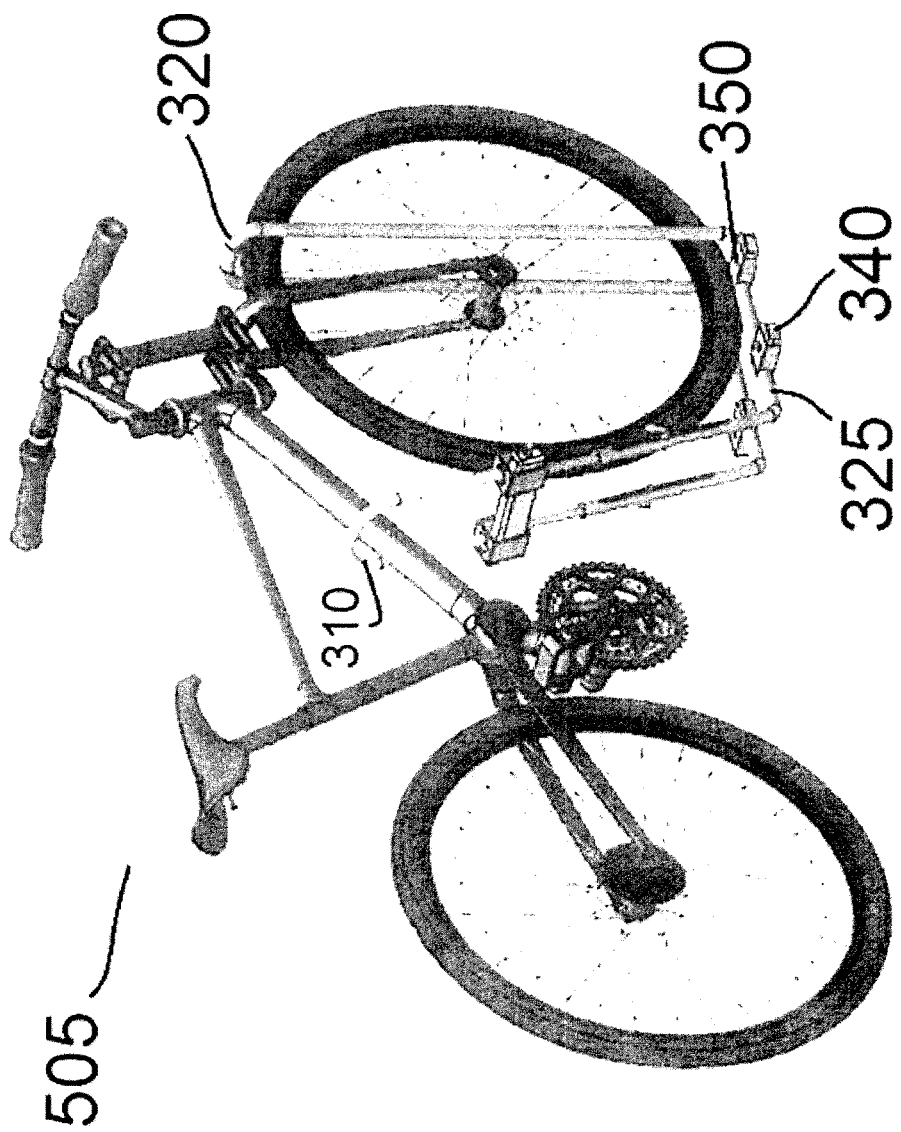
FIG. 18E is a perspective view of a bicycle in position on the bicycle rack.

FIGS. 15 to 17 show an embodiment of a bicycle rack 300 for use with loader 10. Bicycle rack 300 includes first and second elevated U portions 310, 320 and horizontal bars 325. As shown in FIG. 18E, U portion 310 is sized and shaped to receive a frame of a bicycle, and includes removable bar 330 which may be removed to lock the frame to prevent theft. U portion 320 is sized and shaped to fit of a wheel of a bicycle. Horizontal bars 325 include perforated extensions 340 including perforations 350 to allow attachment to plate 250, and platform 100 or platform extension 110 via pins or bolts. Plastic materials of varying thickness can be inserted in or to cover the U portions 310, 320, to prevent damage to the bicycle frame and provide fine adjustments to accommodate different sizes/heights of bicycles.

FIGS. 18A to 18E show the process by which one or more bike wheel holders 410 and a U frame holder 420 may be placed and positioned in a truck bed 20. As shown in FIG. 18A, wheel holders 410 and U frame holder 420 may be secured to plate 250 using pins or bolts or the like. As shown in FIG. 18B, platform extension 110 may be extended from platform 100 and tailgate 30 lowered for ease of loading bicycle 440 on platform 100. Platform 100 can then be positioned horizontally, as shown in FIG. 18C, or angled (for example when used with a short truck bed), as shown in FIG. 18D, allowing access to tailgate 30. Bicycles 505 stored in this configuration are secured against theft.

Figure 19:
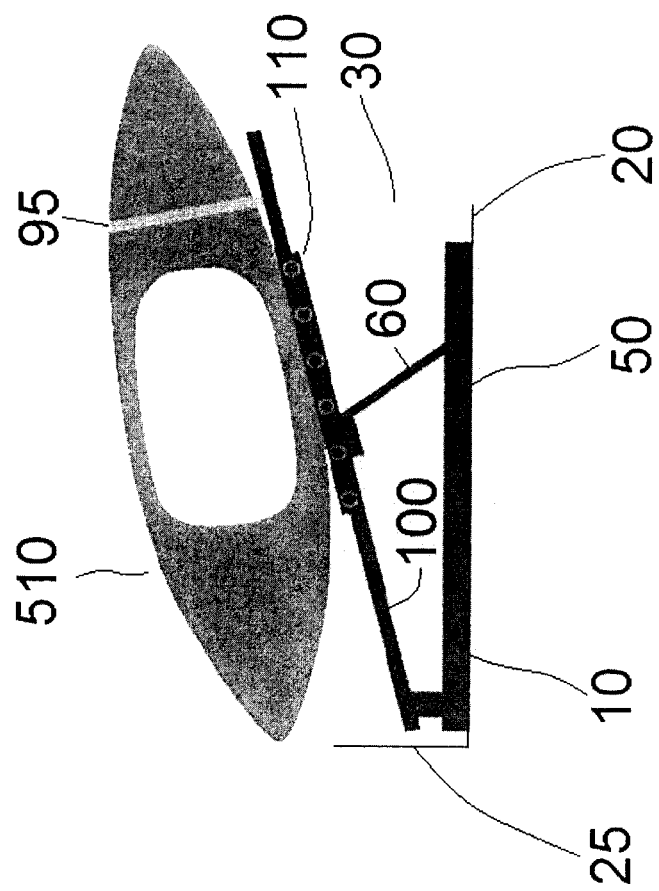
FIG. 19 is a side view of the truck loader in use with a kayak.

As shown in FIG. 19, kayak 510 may be secured to platform extension 110 via bungie cords or ropes 95, or an inverted U-shaped rack attached at either end to platform extension 110.

Figure 20:
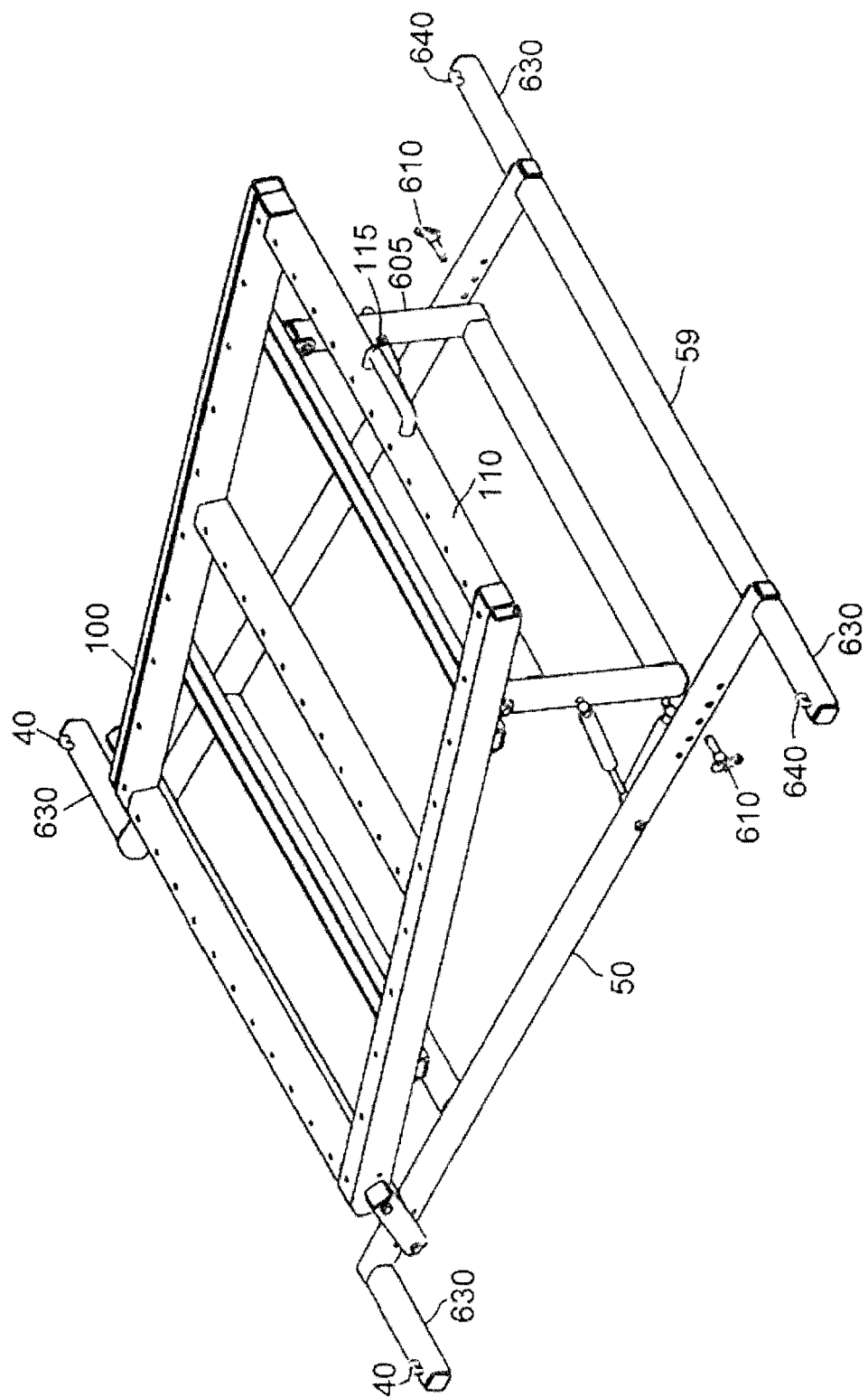
FIG. 20 shows an alternative embodiment of a truck loader.

An alternative embodiment of a truck loader 600 is shown in FIG. 20. In this embodiment, support 605 is moveable and securable in position via pins 610. Loops 640 are not elevated and are positioned on portions 630 of front crossbar 58 and back crossbar 59 which extend past sides 44. In this embodiment support 605 is not secured to base 50 by hinges and may be manually placed into position to receive pins 610 at a position selected by the user. Platform extension 110 is telescopically positioned in platform 100.

Figure 21:
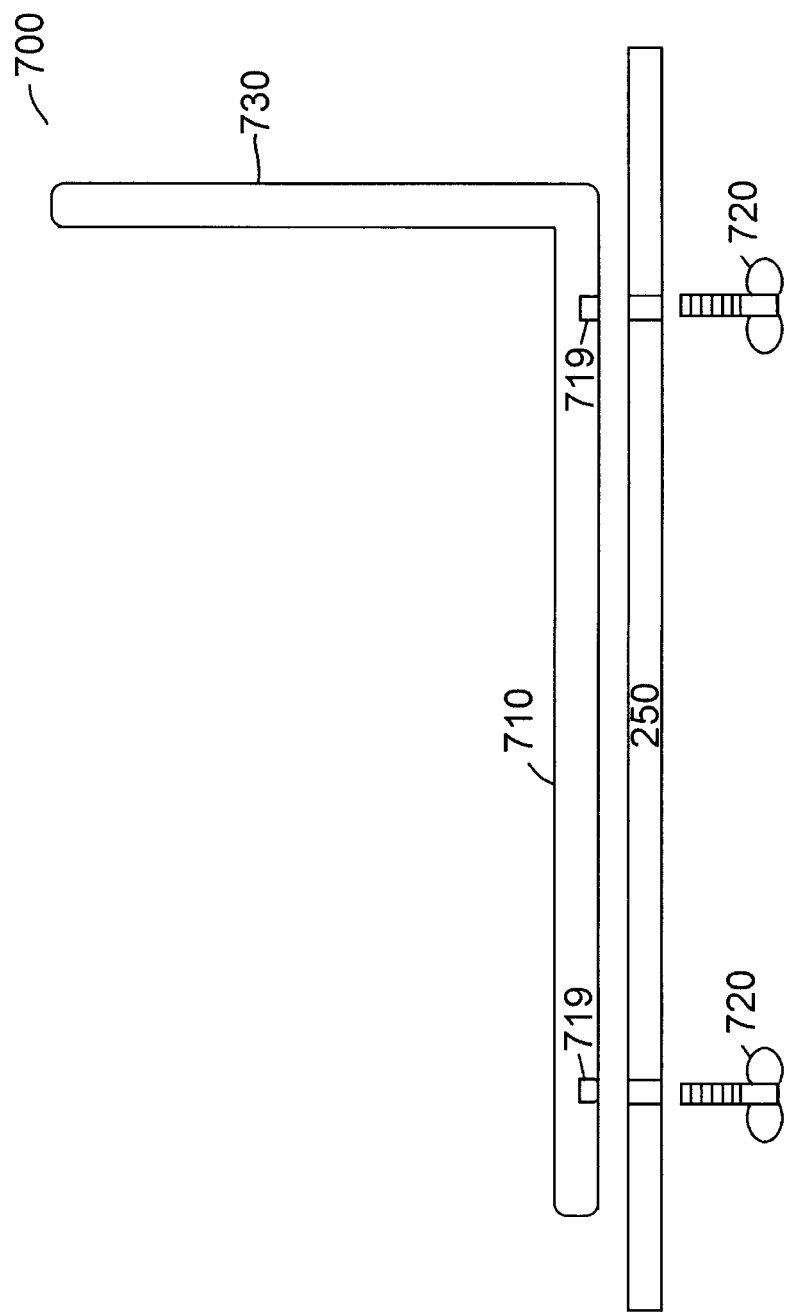
FIG. 21 is a side view of a back stop accessory for use with the truck loader.
Figure 22:
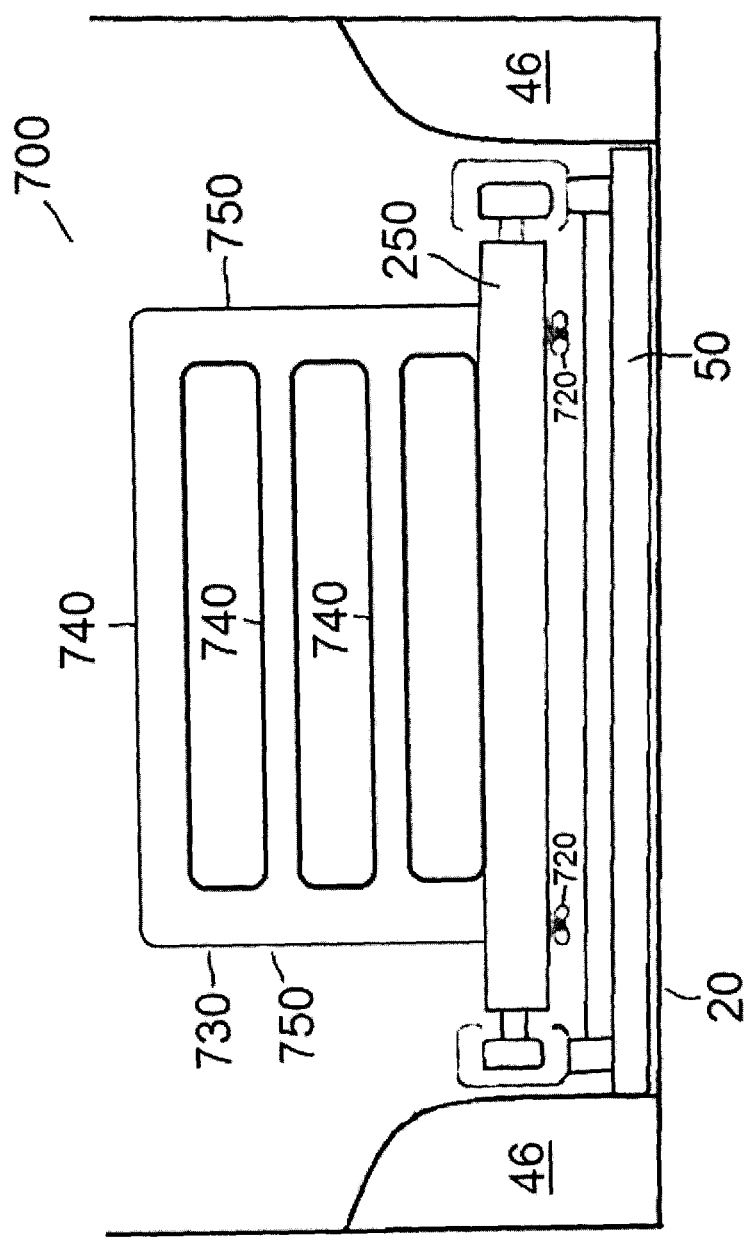
FIG. 22 is a back view thereof.
Figure 23:
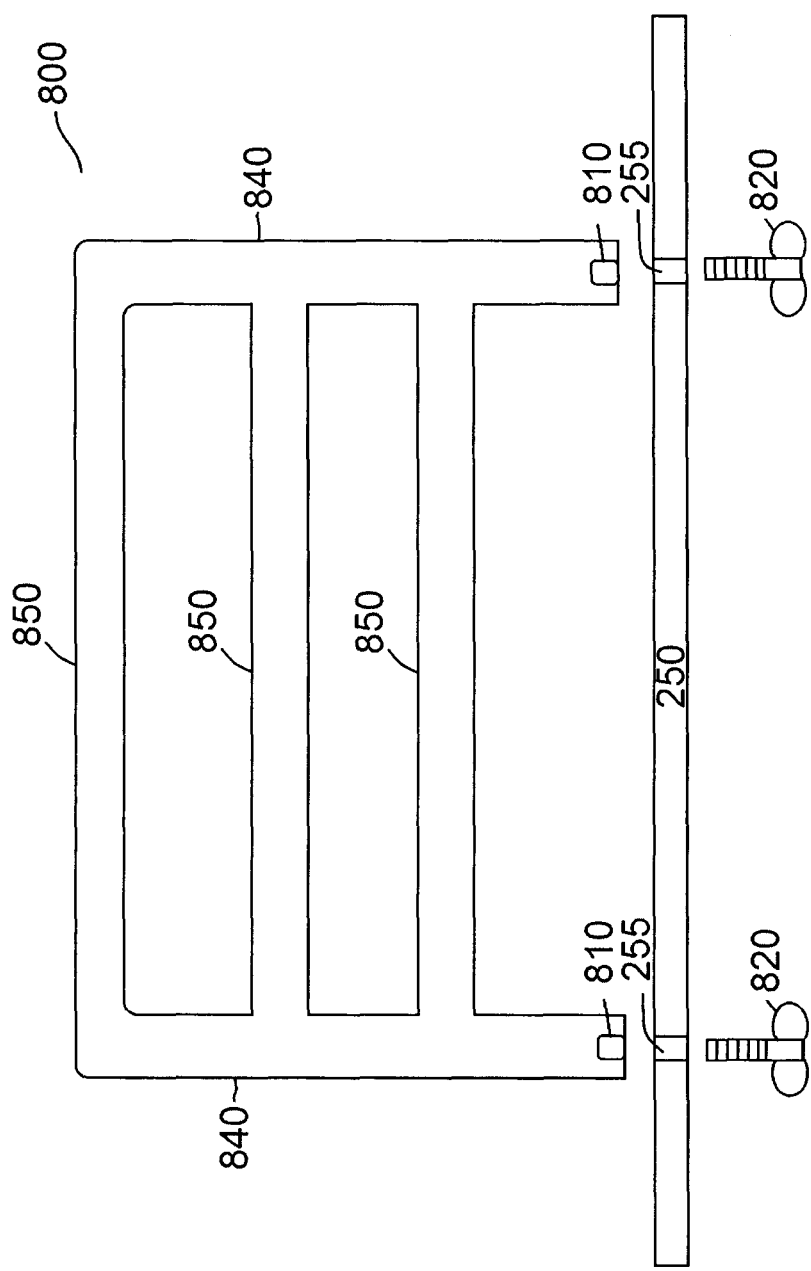
FIG. 23 is a side view of a side barrier for use with the truck loader.

As shown in FIGS. 21 and 22, back stop 700 is attachable to platform 100, platform extension 110, and/or plate 250. Back stop 700 includes a horizontal portion 710 including receptacles 715 for allowing attachment to platform 100, platform extension 110 or plate 250 using bolts 720 or pins. Back stop 700 includes barrier 730 to prevent loads from slipping or otherwise moving past barrier 730. Barrier 730 may be partial as shown in FIG. 22 with cross arms 740 between vertical elements 750, may be a U shaped barrier, or may be a solid barrier. In use, back stop 700 may be attached to the end of platform 100, platform extension 110 or plate 250 before or after placement of the load. Back stop 700 is particularly useful to prevent movement of loads during acceleration or deceleration of the truck As shown in FIG. 23, guardrails 800 can be secured to platform 100, platform extension 110 and/or plate 250 to restrict movement of a load. Guardrails 800 can be provided in a variety of shapes and sizes and can be employed both to prevent lateral movement of loads, if guardrails 800 are placed parallel to sides 44, or to provide an open box location, if two axially positioned guardrails 800 are used in conjunction with two laterally positioned guardrails 800, or alternatively a laterally positioned guardrail 800 and backstop 700. This provides flexibility in creating contained spaces for loads or varying sizes. Guardrails 800 include receptacles 810 for receiving bolts 820 passing through plate 250. Guardrail 800, as shown in FIG. 23 may include two vertical members 840 and a plurality of cross arms 850, or may have another configuration, for example guardrail 800 may be solid.

Figure 24:
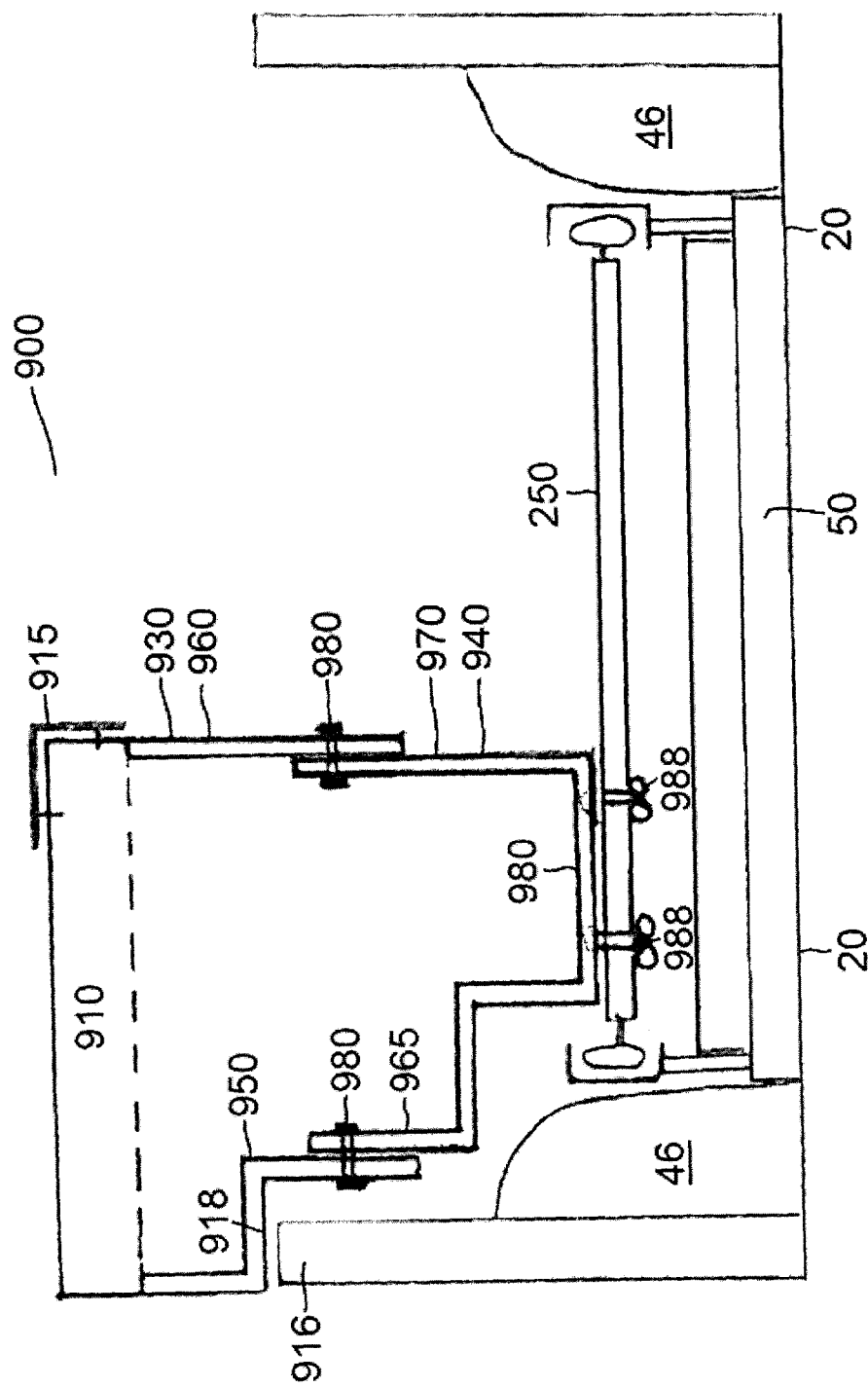
FIG. 24 is a back view of a cargo container for use with the truck loader.

As shown in FIG. 24, an embodiment of a cargo container 900, including a cover 910 can be secured to plate 250, platform extension 110 or platform 100. Cargo container 900 and cover 910 are connected by hinge 915, and may be made of strong vinyl and may be installed or removed easily. Cargo container 900 provides compartments which are useful for groceries or other small loose items, and prevent such loads from moving throughout the truck bed 20.

Cargo container 900 may include first portion 930 and second portion 940, allowing the height of cargo container 900 to be adjustable. Side wall portions 950 and 960 of first portion 930 and side wall portions 965 and 970 of second portion 940 include apertures to allow bolts 980 or pins to secure the sidewall portions 950 to 965 and 960 to 970 together at the desired height. Bottom 980 of cargo container 900 includes receptacles for bolts 988 passing through plate 250, platform 100 or platform extension 110. To accommodate different cargo sizes, cargo boxes of different widths may be provided. Cargo container 900 may be shaped to provide shoulder 918 for resting on truck bed 20 sidewall 916.

Figure 25:
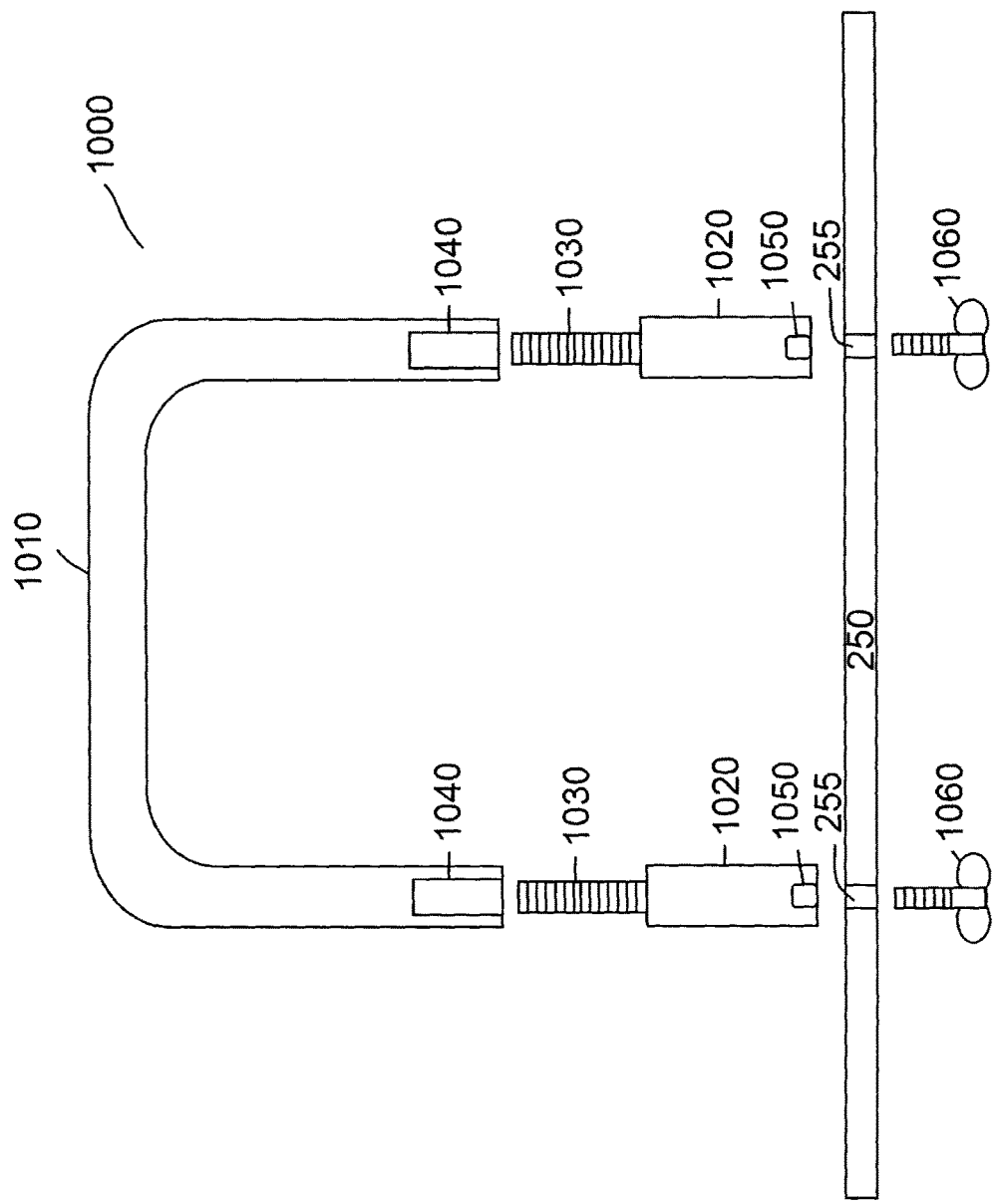
FIG. 25 is a view of a kayak rack for use with the truck loader.

An embodiment of a rack 1000 for use with kayaks is shown in FIG. 25. Rack 1000 forms an inverted adjustable U shape for use to pin down a kayak. Rack 1000 includes an inverted U shaped element 1010 and legs 1020. Legs 1020 include screw portions 1030 to be received by receptacles 1040 at each end of U element 1010. The height of rack 100 is thus adjustable by the amount of screw portion 1030 positioned in receptacles 1040. Legs 1020 include receptacles 1050 for receiving bolts 1060 and permit attachment to plat 250, platform 100 or platform extension 110. In use, U shaped element 1010 may be covered by plastic materials, to prevent damage to the kayak when it is securing the kayak. Rack 1000 may also be used to transport other long items such as lumber, skis, and surf boards.

Truck loader 10 may be placed in the opposite direction such that platform 110 angles downwardly towards the truck cab rather than tail gate 30. This provides optimal versatility for its applications, especially for unusually long objects that would have extended too far outside truck bed 20 if loader 10 was used in the normal configuration. This application is particularly useful if the truck also has a front truck rack. The combined use of loader 10 and a truck rack will strongly secure long cargo.

In an alternative embodiment of the invention, a hydraulic device (manual or electrically/gasoline powered) can be added to loader 10 to allow easy lifting of the platform 100.

In another alternative version of the invention, loader 10 could be smaller sized and used for SUVs or minivans.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

What is claimed is:

1. A truck loader comprising:
    a base placeable within a truck bed;
    a platform, the first end of the platform pivotably connectable directly to the base proximate to a first end of the base, and the first end of the base being positioned at a front of the truck bed; and
    a support pivotably secured to the platform and pivotably secured to the base proximate to a second end of the base;
    wherein the support is moveable from a first position,
    a second end of the platform is positioned proximate to the base to a second position, and
    the second end of the platform is elevated relative to the base.

2. The truck loader of claim 1 further comprising a platform extension configured to retractably extend from the second end of the platform.

3. The truck loader of claim 1 further comprising a plurality of loops configured to secure the base to the truck bed.

4. The truck loader of claim 1 wherein the platform and platform extension comprises a plurality of perforations.

5. The truck loader of claim 1 wherein a first end of the support is slidable along the base.

6. The truck loader of claim 1 wherein a jack is used to move the support from the first position to the second position.

7. The truck loader of claim 1 further comprising a plate securable to the platform or the platform extension, the plate comprising a plurality of apertures, at least a portion of the apertures usable for securing the plate to the platform or the platform extension.

8. The truck loader of claim 2 wherein the platform comprises arms forming a C channel for supporting the platform extension.

9. The truck loader of claim 1 wherein the support is fixed in position using pins passing through the sides of the base.

10. The truck loader of claim 7 further comprising a cargo container securable to the plate.

11. The truck loader of claim 1 wherein the base has a plurality of perforations sized to engage a pivotal connection of the support.

12. The truck loader of claim 1 wherein the platform has a plurality of perforations sized to engage a pivotal connection of the support.

* * * * *